United States Patent

Bainbridge et al.

Patent Number: 6,161,145
Date of Patent: Dec. 12, 2000

[54] UPDATING SERVER-RELATED DATA AT A CLIENT

[75] Inventors: Andrew John Bainbridge, Winchester; Stephen James Cocks, Eastleigh, both of United Kingdom; Donald Francis Ferguson, Yorktown Heights, N.Y.; Thomas Freund, Winchester, United Kingdom; Avraham Leff, New Hempstead, N.Y.; Glyn Normington, Winchester, United Kingdom; James Thomas Rayfield, Ridgefield, Conn.; Robert Anthony Storey, Southampton, United Kingdom

[73] Assignee: International Business Machines Corporation, Armonk, N.Y.

[21] Appl. No.: 08/853,382

[22] Filed: May 8, 1997

[51] Int. Cl.$^7$ .................................................. G06F 15/16
[52] U.S. Cl. ..................... 709/246; 709/203; 709/217; 709/219; 709/225; 709/229; 709/232; 709/242; 713/200; 713/201; 713/202; 713/172; 713/158; 713/171; 713/182; 713/185; 707/10
[58] Field of Search .................................... 709/203, 217, 709/219, 225, 229, 232, 242, 246, 227; 713/200, 201, 202, 172, 158, 171, 182, 185; 707/10

[56] References Cited

U.S. PATENT DOCUMENTS

| | | | |
|---|---|---|---|
| 5,046,002 | 9/1991 | Takashi et al. | 707/8 |
| 5,396,613 | 3/1995 | Hollaar | 714/4 |
| 5,404,523 | 4/1995 | DellaFera et al. | 709/101 |
| 5,542,046 | 7/1996 | Carlson et al. | 713/200 |
| 5,606,663 | 2/1997 | Kadooka | 713/202 |
| 5,611,048 | 3/1997 | Jacobs et al. | 713/202 |
| 5,613,155 | 3/1997 | Baldiga et al. | 710/5 |
| 5,627,961 | 5/1997 | Sharman | 714/6 |
| 5,627,967 | 5/1997 | Dauerer et al. | 713/202 |
| 5,634,122 | 5/1997 | Loucks et al. | 707/8 |
| 5,638,513 | 6/1997 | Ananda | 713/202 |
| 5,649,185 | 7/1997 | Antognini et al. | 707/9 |
| 5,689,566 | 11/1997 | Nguyen | 380/25 |
| 5,721,914 | 2/1998 | DeVries | 707/104 |
| 5,802,062 | 9/1998 | Gehani et al. | 370/465 |
| 5,864,667 | 1/1999 | Barkan | 713/201 |
| 5,864,852 | 1/1999 | Luotonen | 709/246 |
| 5,892,902 | 4/1999 | Clark | 713/201 |
| 5,907,621 | 5/1999 | Bachman et al. | 713/155 |
| 5,923,756 | 7/1999 | Shambroom | 380/21 |
| 5,944,825 | 8/1999 | Bellemore et al. | 713/202 |
| 6,006,331 | 12/1999 | Chu et al. | 713/201 |
| 6,006,333 | 12/1999 | Nielsen | 713/202 |

*Primary Examiner*—Mehmet B. Geckil
*Assistant Examiner*—William C. Vaughn, Jr.
*Attorney, Agent, or Firm*—David M. Shofi; Anne Vachon Dougherty

[57] ABSTRACT

In a data processing environment where a client requests a server to perform part of its processing, a method of updating the client's version of server-related data without requiring the client to be a server, includes steps of: receiving, at a control point server, a first request from the client requesting that server-related data be transferred from the control point server to the client; and in response to the first request, sending the server-related data from the control point server to the client, along with a unique bind token identifying a version number of the server-related data such that each time the server-related data changes a new unique bind token is associated with the data, where the client uses the server-related data to form a second request for the server to perform part of the client's processing, and where the client sends said bind token to the server as part of the second request.

7 Claims, 5 Drawing Sheets

UPDATING SERVER-RELATED DATA AT A CLIENT

FIELD OF THE INVENTION

The present invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work.

The client computer (which could, for example, be a personal computer having the IBM OS/2 operating system installed thereon) has an application program running on its operating system ("IBM" and "OS/2" are trademarks of the International Business Machines Corporation). The application program will periodically require work to be performed on a server and/or data to be returned from a server for subsequent use by the application program. The server can be, for example, a high-powered mainframe computer running on IBM's MVS operating system. Client/server computing is not limited to the client being on one machine and the server being on another, and it is very common for both the client and server to be located on the same physical machine, with the client and server being separate processes running on the machine.

Oftentimes, in client/server computing systems, a client needs to maintain a record of some server-related information which the client will use in sending requests to a server. An example is in a security authentication process where a client must prove its identity to a trusted third-party control server before it is allowed to communicate directly with a working server which the client wishes to use to satisfy a request. The client must store a ticket which the client receives from the trusted control server and then provides to the working server during this authentication process. There is a need, in these types of systems, for the client to have the most recent version of the server-related data. Once the client obtains the server-related data in its internal store, the client keeps using this locally stored data in formulating further client requests. If a change is made to the server-related data and the client is not made aware of this change, the client will not be able to make a valid request to a server, as the client's locally stored server-related data is outdated.

One way of keeping the client's server-related data updated would be to treat the client as a server and send the client a request instructing the client to update its stored version of the data. However, this requires adding function to the client which makes the client system more complicated. It is more desirable to have a so-called "thin-client" which is purely a client and thus can only send requests and cannot receive requests from other distributed computers on the network.

Also, even if the client were provided with added function, it would still be necessary to keep track (at the server end) of which clients are concerned with which data so that a decision can be made as to which clients need to be notified of a data update. This requires much overhead at the server end. Further, as the number of client computers continues to increase, there are more and more clients to send update requests to. Thus, it becomes difficult to scale up a network to include a larger number of clients.

SUMMARY OF THE INVENTION

According to one aspect, the present invention provides in a data processing environment where a client requests a server to perform part of its processing, a method of updating said client's version of server-related data, comprising steps of: receiving, at a control point server, a first request from said client requesting that server-related data be transferred from said control point server to said client; and in response to said first request, sending said server-related data from said control point server to said client, along with a unique bind token identifying a version number of said server-related data such that each time said server-related data changes a new unique bind token is associated with said data. Said client uses said server-related data to form a second request for said server to perform part of said client's processing and said client sends said bind token to said server as part of said second request.

Preferably, said client sends said bind token to said server in a service context of said second request. Further preferably, upon receiving said second request, said server performs steps of: checking whether said bind token received in said second request is stored in said server's local store and is marked as valid; if said checking step determines that said bind token is stored in said server's local store and is marked as valid, scheduling said request for execution within said server.

Further preferably, said server performs further steps of: if said checking step returns a negative result such that said scheduling step is not reached, checking whether said token is marked as invalid; if said bind token is invalid, returning said bind token to said client as part of a reply thereto; and said client performs the steps of: receiving said reply from said server; in response to said receiving step, forming a third request for updated server-related data corresponding to said invalid bind token included in said reply; sending said request to said control point server; receiving a reply from said control point server with updated server-related data including a new bind token; forming a fourth request using said updated server-related data received from said control point server and including said new bind token; and sending said fourth request to said server.

According to a second aspect, the invention provides, in a data processing environment where a client requests a server to perform part of its processing, a system for updating said client's version of server-related data, comprising: respective means for performing the above mentioned method steps.

According to a third aspect, the invention provides a computer program product stored on a computer-readable storage medium, said product including software code portions for, when run by a computer, performing, in a data processing environment where a client requests a server to perform part of its processing, a method of updating said client's version of server-related data, said software code portions including: respective means for performing the above mentioned method steps.

Thus, the invention allows the updating of clients holding server-related data without turning the clients into servers which would require adding extra function thereto. Thus, the clients can be maintained as "thin clients", clients performing very little function, which is highly advantageous in the modern trend towards network computing where most of the intelligence resides on central servers rather than at each individual client.

DETAILED DESCRIPTION OF THE PREFERRED EMBODIMENTS

Figure 1:
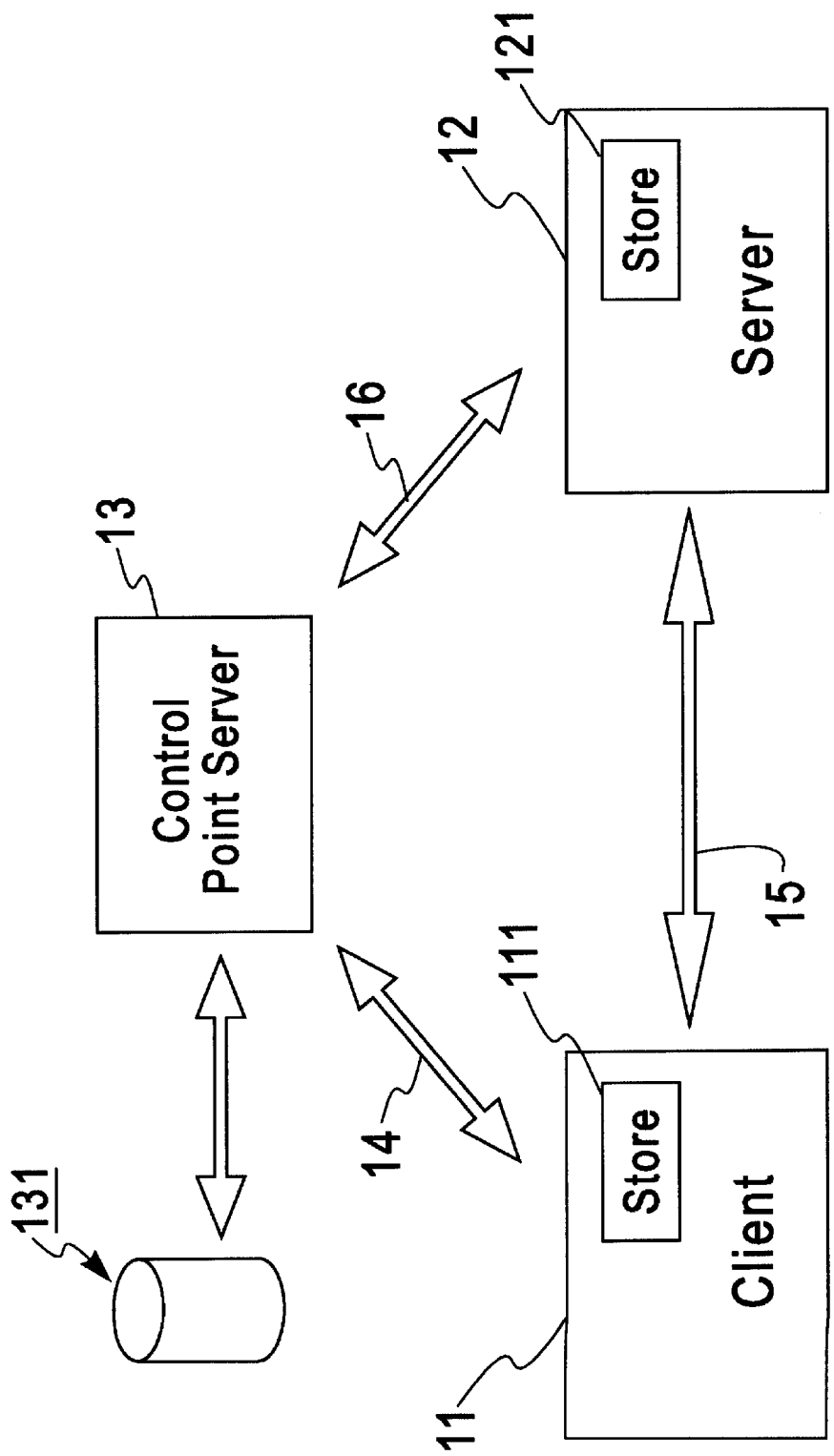
FIG. 1 shows a network architecture to which a preferred embodiment of the present invention is applied.

Client 11 in FIG. 1 needs to keep a local store of information related to server 12, because the client intends to issue requests which the server will fulfil, and this communication requires that the client 11 know something about the server 12 so it can structure its requests accordingly, or so that it can prove that it is authorized to communicate with server 12. To this effect, client 11 stores server-related data in a local store 111, which can be a cache memory (usually implemented as a static random access memory (SRAM) chip). The server 12 also has a local store 121, which it uses to store bind tokens related to the server-related data, as will be described below.

A control point server 13 acts as an intermediary between the client 11 and server 12 and holds a central data repository 131 storing data related to servers such as server 12 to which clients may wish to send work requests. A systems administrator overseeing and maintaining the network makes administrative changes thereto by altering the data stored in the central repository 131 via the control point server 13.

As is conventional in this type of network, before attempting to make a first direct request to server 12, client 11 first communicates with control point server 13 along line 14 to obtain some server-related data therefrom for use in formulating the client request that will eventually be sent to the server 12 along line 15. For example, the client 11 may need to learn how the server 12 is configured before sending server 12 a request, or client 11 may need to prove to control point server 13 that client 11 is who it says it is before control point server 13 provides client 11 with security data (e.g, a password) which client 11 would then use in sending server 12 a direct request on line 15.

Once the client 11 has requested data from the control point server 13 regarding a particular server 12, it stores this data in its local store 111 so that it can use this data in sending direct requests to server 12 along line 15. Client 11 maintains this data in local store 111 even after sending the request to server 12 so that it can use the data in sending a future request to server 12 without having to go back to the control point server 13 in between requests. The client 11 assumes that it already has the server-related data for server 12 so it does not need to ask for it again from control point server 13 before sending the next request.

However, the systems administrator may have made a change to the data stored in repository 131 in between the two client requests to server 12, such a change making the data related to server 12 stored in client 11's store 111 outdated. Thus, the client 11's local store must be somehow updated to reflect this change so that the client is working with the most recent version of the server-related data.

The major problem in updating the client in this way is that the client 11 cannot be provided with a dedicated update instruction, since client 11 is a "pure" client which can only give instructions, not carry them out. Thus, client 11 is incapable of receiving and carrying out an update instruction from either control point server 13 or server 12 (each of which would be acting as a client to send a request to block 11 which would then be a server instead of a client since it is receiving an instruction).

Figure 2:
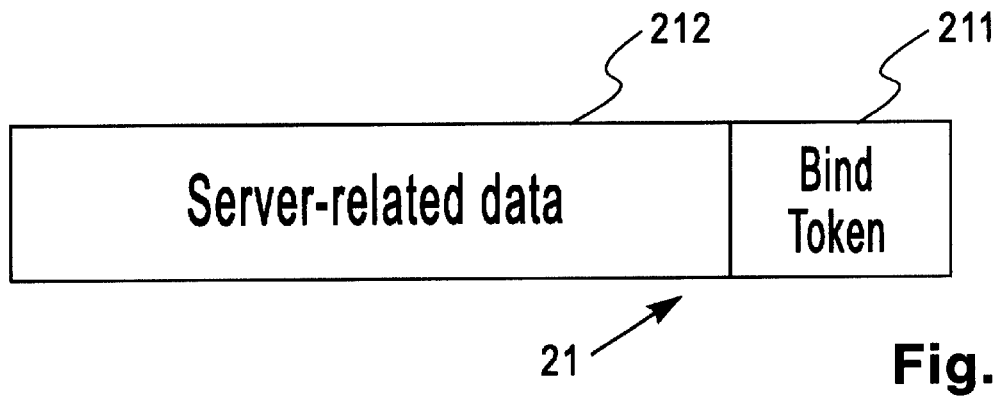
FIG. 2 shows the data format of server-related information sent between the control point server and the client shown in FIG. 1.

Applicant has found that this drawback can be overcome by associating a bind token 211 (see FIG. 2) with the server related data 212 included in the reply 21 from control point server 13 to client 11. Reply 21 is issued by the control point server 13 in response to the client 11's request for the server-related information from the control point server 13.

This bind token 211 (which can be implemented as a Universal Unique Identifier—UUID) is, in essence, a unique version number, identifying a particular version of the server-related data. That is, once the systems administrator changes the server-related data stored in repository 131, the version number changes (e.g., increases by one). A different bind token is thus associated with each version number of each server-related data. If the client makes multiple requests for different types of server-related data, a corresponding number of replies 21 will be sent from control point server 13 to client 11, each with its own unique bind token corresponding to the most recent version of the appropriate server-related data. The process of using these bind tokens to keep a "pure" client updated (with respect to server-related data changes) will now be explained with reference to the figures.

Figure 3:
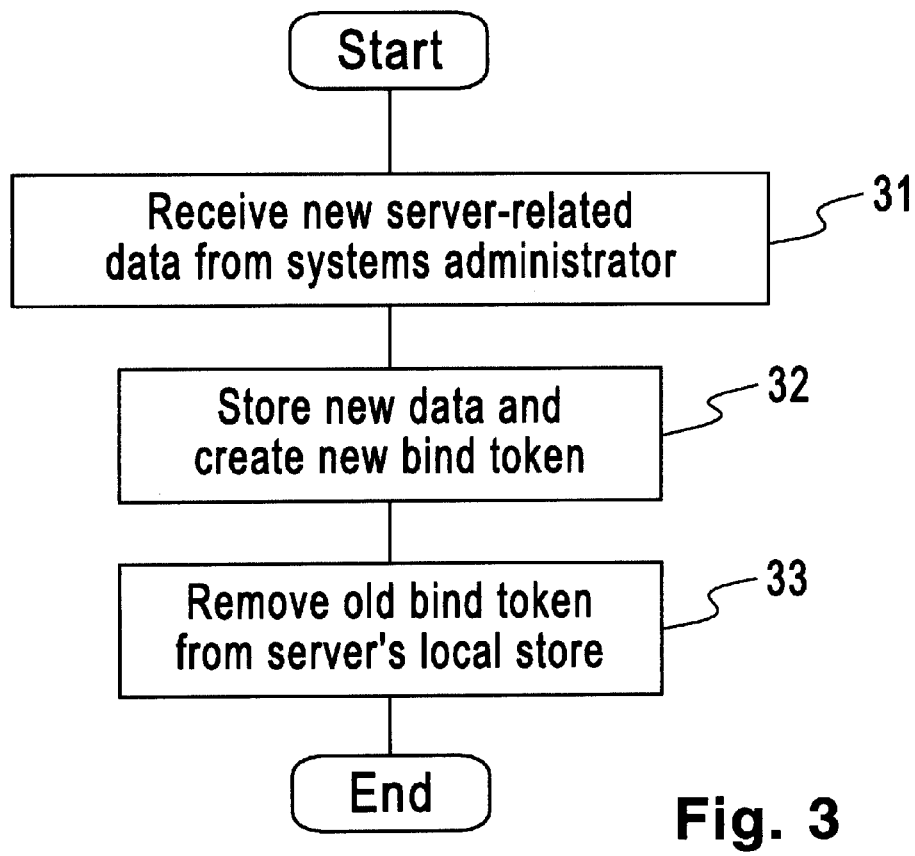
FIG. 3 is a flow chart showing the software steps taking place within the control point server of FIG. 1 according to a preferred embodiment of the present invention.

When the systems administrator has altered any server-related data, software running on the control point server 13 receives (step 31 of FIG. 3) the new server-related data from the administrator, stores it in repository 131 (updating the previous version of the stored data) and creates a new bind token (step 32) corresponding to this new server-related data and stores it in repository 131 along with the new server-related data to which it relates. That is, the old version of the data had one unique bind token associated therewith, but now, since the data has been updated, a new unique bind token is created. Then, the control point server removes (step 33) the old bind token from server 12's local store 121 as invalid by sending server 12 a request to this effect via line 16. Since server 12 is a server, control point server 13 can send an update request to server 12 requesting server 12 to update its local store 121 by removing the old bind token. This sequence of steps is carried out each time the systems administrator changes (step 31) any server-related data in repository 131.

Figure 4:
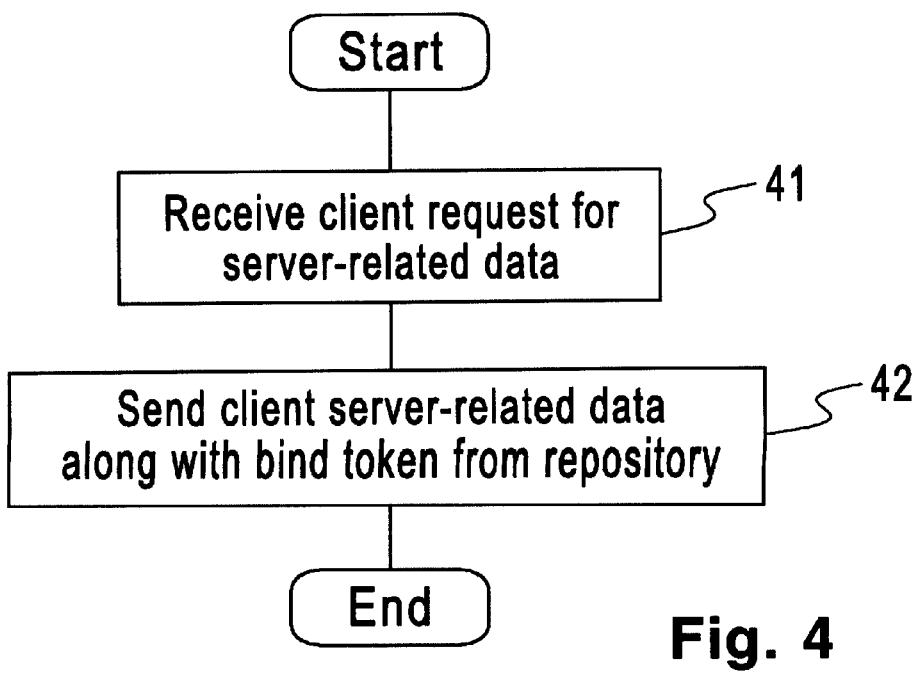
FIG. 4 is a flow chart showing additional software steps taking place within the control point server of FIG. 1 according to a preferred embodiment of the present invention.

Software running on the control point server 13 also receives (step 41 in FIG. 4) a request from client 11 for server-related data along line 14 (the client is requesting the server-related data from the control point server 13 so that it can use this data in formulating a later request which it will send directly to server 12, which could be called a "working server" to distinguish it from the control point server). Upon receiving such a request, the data packet 21, including the server-related data 212 and the bind token 211, as stored in the repository 131, is sent to the client 11's local store 111 over line 14 (step 42).

Figure 5:
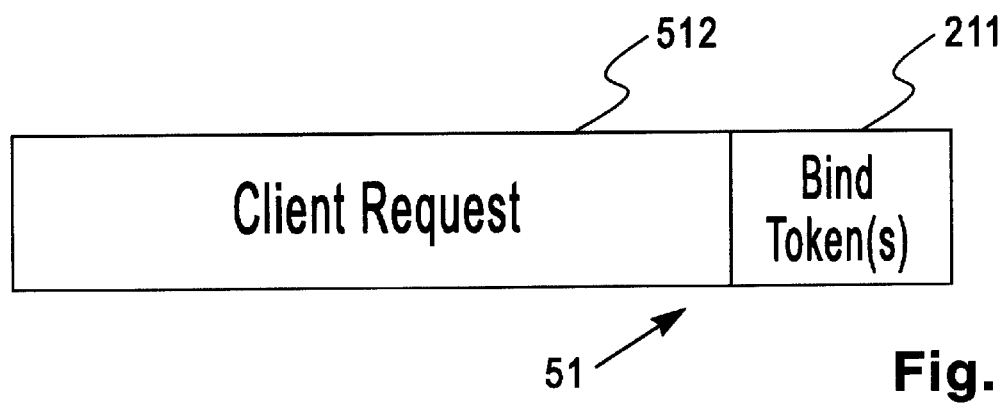
FIG. 5 shows the data format of a client request sent between the client and the server shown in FIG. 1.

When the client 11 makes a request to server 12, using the server-related data 212 stored in its local store 111, any bind tokens 211 associated with the server-related data which the client 11 has used in formulating the request to server 12, are added onto the end of its request 512 (FIG. 5) to form an aggregate request 51 and sent to the server 12 in a service context. That is, in forming request 512, if the client 11 uses server-related data which it has received as a result of issuing more than one request to control point server 13, the bind token associated with each reply from control point server 13 is sent to the server 12 along with the request 512 in a service context. These bind tokens are, in effect, the ones which the client "thinks" are valid.

Figure 6:
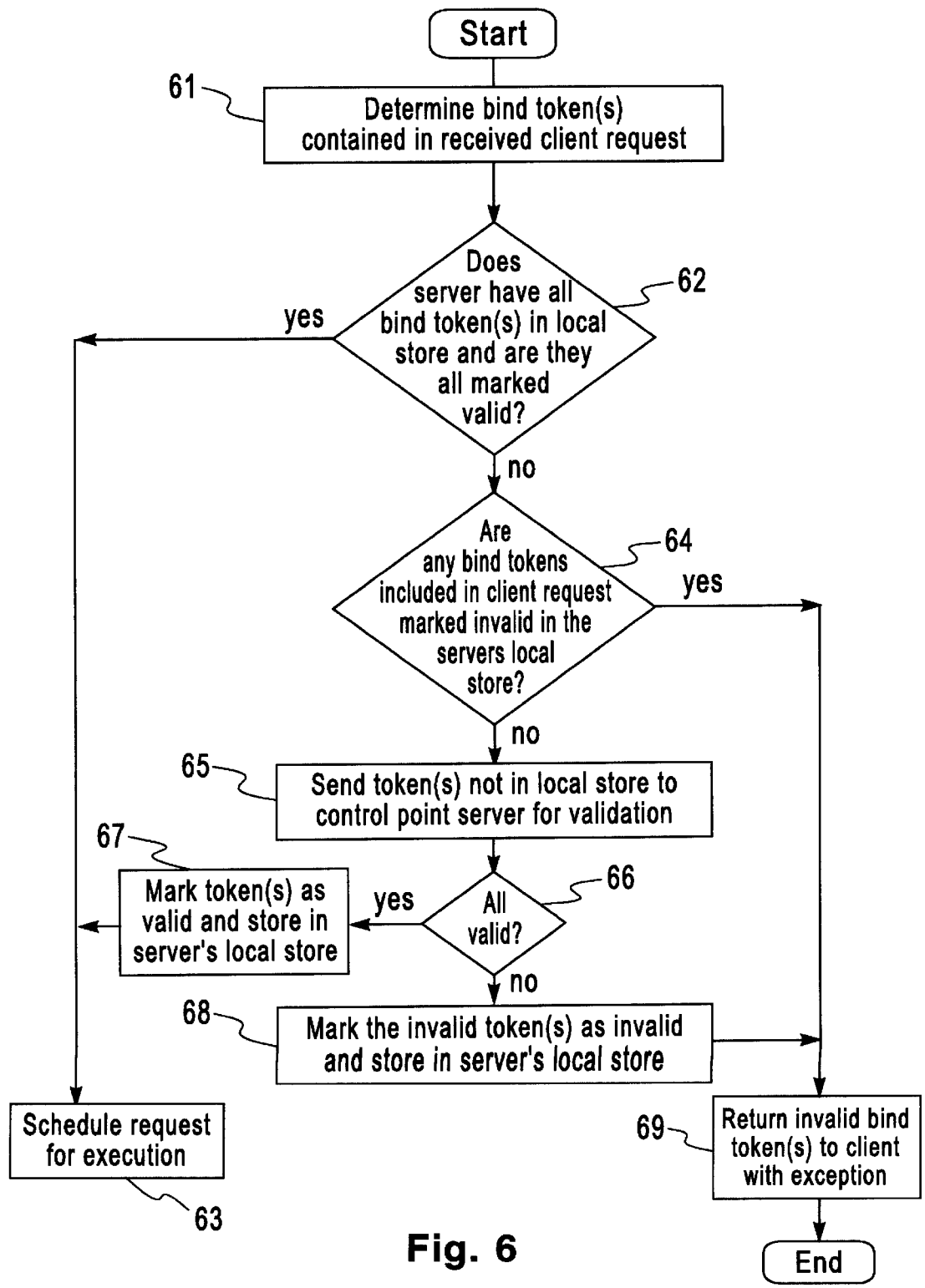
FIG. 6 is a flow chart showing the software steps taking place within the server of FIG. 1 according to a preferred embodiment of the present invention.
Figure 8:
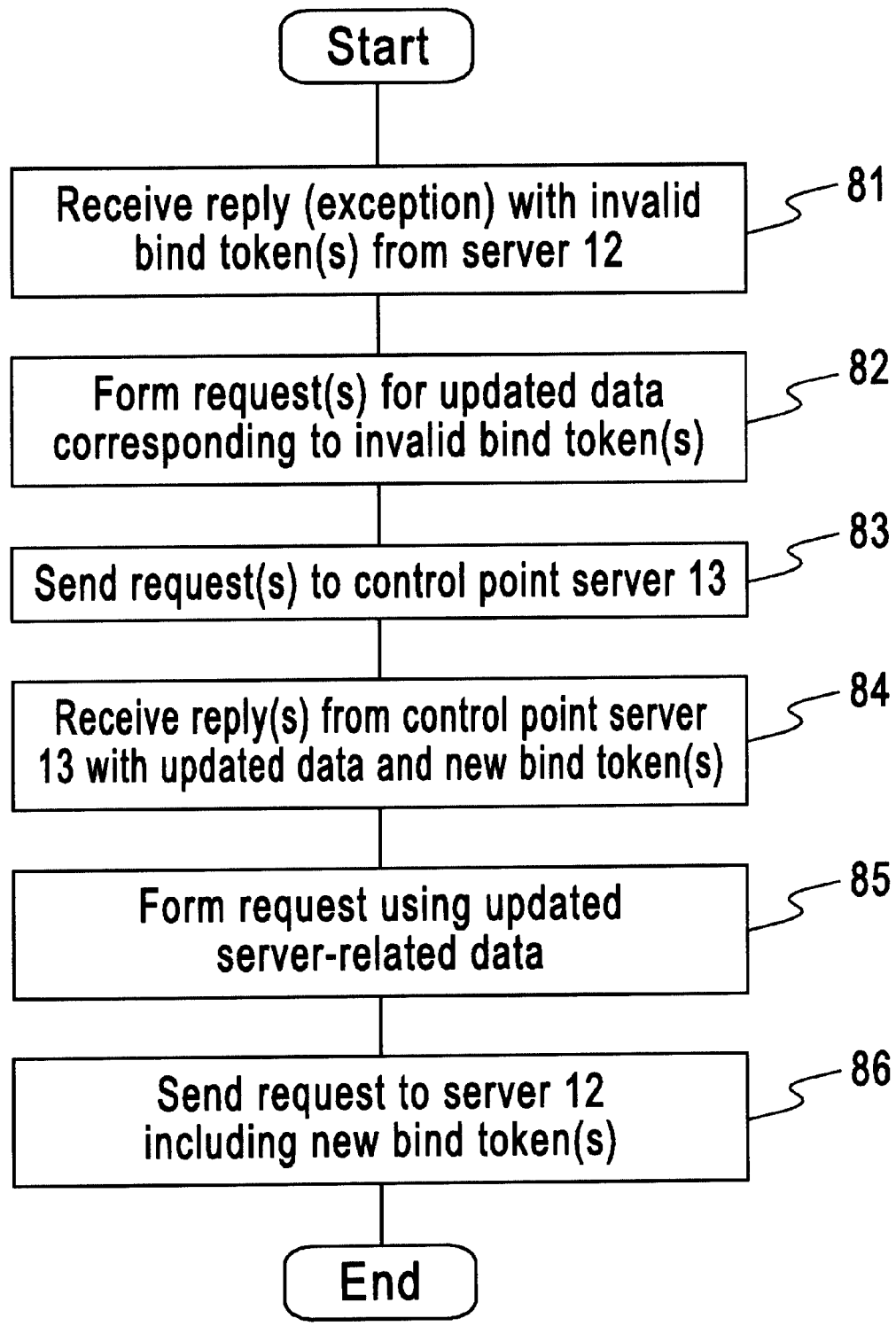
FIG. 8 is a flow chart showing the software steps taking place within the client of FIG. 1 according to a preferred embodiment of the present invention.

Software running on the server 12 determines, for each incoming client request 51, any bind tokens included in the request (step 61 of FIG. 6). It then checks (step 62) to determine whether it already has all of these bind tokens stored in its local store 121 AND whether they are all marked as valid (if this is true, then this condition will have resulted from a previous run-through of the flowchart of FIG. 6 for a different client request). If it has all of the bind tokens in its local store 121 and they are all marked as valid, the client 11 has used the correct (most recent version of the) server-related data when the client formulated the request 51 and the client request is simply scheduled for execution within server 12 (step 63).

If, however, the answer obtained at step 62 is NO, the server software next checks (step 64) whether there are any received tokens which came with this latest client request that are marked invalid in the server 12's local store. If there are none, the server sends the bind tokens (step 65) to the control point server 13 along line 16 to determine whether these bind tokens are valid.

When the control point server 13 receives the tokens, it checks its repository 131 to determine whether each bind token which the server wishes to validate matches the bind token it has stored for the respective server-related data. If there is a match, then the bind token is valid and the control point server 13 informs the server 12 of this fact. When server 12 learns that all of the bind tokens are valid (step 66), it stores the bind tokens in its local store 121 (step 67) and schedules the client request for execution (step 63).

Figure 7:
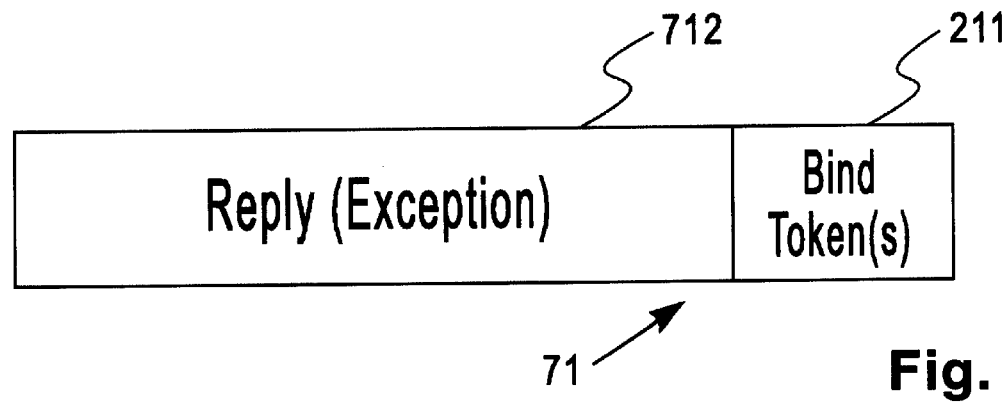
FIG. 7 shows the data format of a reply sent from the server to the client shown in FIG. 1.

If, however, the control point server 13 cannot find a match in its repository 131 for at least one bind token, the server 12 is informed by the control point server 13 that all of the bind tokens are not valid (step 66), or, stated another way, at least one token is invalid. Then, the server 12 marks (step 68) the invalid tokens as invalid in the server's local store and rejects the request 51 by sending (step 69) the client a reply (in the form of an exception 712 see FIG. 7) to which the bind token(s) 211 that was/were found to be invalid is included in a service context. This returning of the bind token(s) is not a request to the client 11 (since client 11 is a "pure" client and thus cannot receive requests). Instead, the bind token(s) is/are returned in the service context. The reply 712 and the invalid bind token(s) 211 make up the aggregate reply 71 which is sent to the client 11 from the server 12.

Note from FIG. 6 that at step 64 if the NO branch is taken, indicating that some of the received tokens are marked as invalid, the step 69 is taken with the invalid token(s) being returned. That is, in this latter case, the server 12 already knows that the token(s) is (are) invalid and thus the server 12 does not have to ask the control point server whether it (they) are valid (as it had to in the above discussion concerning tokens which the server was receiving for the first time).

Note that a server 12 may only mark tokens as invalid in its local store if it asks the control point server 13 whether the tokens are valid and is told that they are not valid. If the control point server 13 tells the server 12 to remove the bind tokens from the server's local store, the bind tokens may not be marked as invalid as, in this case, the control point server 13 may decide not to complete the update for some reason (such as a communications or persistent storage failure) in which case the bind tokens which were removed from the server's local store will continue to be valid.

When software running on the client 11 determines that an invalid bind token has been returned from a server 12 in a reply (exception) 71 (step 81), the client uses the information in the reply 71 to form a request to control point server 13 for updated server-related information (step 82) corresponding to the invalid bind token(s) received from the server 12. That is, the client takes the returned invalid bind token(s) and uses it/them to find the corresponding server-related data stored in its local store 111, and then uses this information to form the request(s) for an update to this data (one request for each returned invalid bind token). The client 11 then sends (step 83) the request(s) to the control point server 13 along line 14.

The control point server 13 would then detect that a client has requested server-related data (step 41 of FIG. 4) and send the updated data 21 (along with the new and valid bind token 211 attached thereto) to the client from repository 131 along line 14.

Once the client receives the updated server-related data (step 84), it forms (step 85) a request 51 with the valid bind token(s) (just received from the control point server 13) included in a service context, and sends (step 86) this request to server 12.

The server 12 will then take the NO branch at step 62 of FIG. 6 as it still does not have the bind token in its local store 121. It then takes the NO branch at step 64, as the client 11 is no longer using the outdated server-related data and thus there are no tokens marked as invalid. It then sends the bind tokens to the control point server 13 for validation (step 65) and then is informed by the control point server 13 that the bind tokens are valid (as they match the bind tokens stored in repository 131 for the respective server-related data)(step 66). They would have to match, because the client has just received these tokens from the control point server at step 84. Accordingly, following the flow of FIG. 6, the server 12 marks these tokens as valid, stores the bind tokens in its local store 121, and schedules the request for execution (assured that the client has used the most recent version of the server-related data when the client formed the request). Now, if another client request is received which uses these bind tokens, the YES branch will be taken at step 62 since the server 12 now has this bind token in its local store 121, and that future client request would be scheduled for execution within the server 12 (step 63) more quickly.

Thus, the client's local store 111 of server-related data is updated (allowing the client to form a client request based on the most recent server-related data) without having to add extra function to the client to turn it into a server. This is attained by supplying bind tokens to the client as part of the replies which it normally receives from a control point server in response to the client's requests. The "pure" client already expects to receive the information without the bind tokens, so very little function need be added to the client in order to deal with these tokens.

Thus, the client's version of the server-related data can be updated without adding a large amount of function to the client, allowing the client to remain "thin" consistent with the modern trend towards network computing where most of the function is located on the servers rather than the clients.

What is claimed is:

1. In a data processing environment where a client requests a server to perform part of its processing, a method of updating said client's version of server-related client access data, comprising steps of:

receiving, at a control point server, a first request from said client requesting that server-related client access data be transferred from said control point server to said client; and in response to said first request, sending said server-related client access data from said control point server to said client, along with a unique bind token identifying a version number of said server-related client access data such that each time said server-related client access data changes a new unique bind token is associated with said data, wherein said client uses said server-related client access data to form a second request for said server to perform part of said client's processing, and wherein said client sends bind token to said server as part of said second request, wherein, upon receiving said second request said server performs steps of:
  checking whether said bind token received in said second request is stored in said server's local store and is marked as valid; and
  if said checking step determines that said bind token is stored in said server's local store and is marked valid, scheduling said request form execution within said server, wherein said server performs further steps of;
  if said checking step returns a negative result such that said scheduling step is not reached, checking whether said token is marked as invalid; and if said token is marked invalid, returning said bind token to said client as part of a reply thereto.

2. The method of claim 1, wherein said client performs the steps of:
  receiving said reply from said server;
  in response to said receiving step, forming a third request for updated server-related client access data corresponding to said invalid bind token included in said reply;
  sending said third request to said control point server;
  receiving a reply from said control point server with updated server-related client access data and a new bind token;
  forming a fourth request using said updated server-related client access data received from said control point server and including said new bind token; and
  sending said fourth request to said server.

3. The method of claim 1 wherein the client is a pure client which can send requests to servers but cannot receive requests from other distributed computers on the network.

4. In a data processing environment where a client requests a server to perform part of its processing, a system for updating said client's version of server-related client access data, comprising:
  means for receiving, at a control point server, a first request from said client requesting that server-related client access data be transferred from said control point server to said client; and
  means for, in response to said first request, sending said server-related client access data from said control point server to said client, along with a unique bind token identifying a version number of said server-related client access data such that each time said server-related client access data changes a new unique bind token is associated with said data, wherein said client uses said server-related client access data to form a second request for said server to perform part of said client's processing, and wherein said client sends bind token to said server as part of said second request, wherein, upon receiving said second request said server performs steps of:
  checking whether said bind token received in said second request is stored in said server's local store and is marked as valid; and
  if said checking step determines that said bind token is stored in said server's local store and is marked valid, scheduling said request form execution within said server, wherein said server performs further steps of:
  if said checking step returns a negative result such that said scheduling step is not reached, checking whether said token is marked as invalid; and if said token is marked invalid, returning said bind token to said client as part of a reply thereto.

5. The system of claim 4 wherein the client is a pure client which can send requests to servers but cannot receive requests from other distributed computers on the network.

6. A computer program product stored on a computer-readable storage medium, said product including software portions for, when run be a computer, performing, in a data processing environment where a client requests a server to perform part of its processing, a method of updating said client's version of server-related client access data, said software code portions including:
  means for receiving, at a control point server, a first request from said client requesting that server-related client access data be transferred from said control point server to said client; and
  means for, in response to said first request, sending said server-related client access data from said control point server to said client, along with a unique bind token identifying a version number of said server-related client access data such that each time said server-related client access data changes a new unique bind token is associated with said data, wherein said client uses said server-related client access data to form a second request for said server to perform part of said client's processing, and wherein said client sends bind token to said server as part of said second request, wherein, upon receiving said second request, said server performs steps of:
  checking whether said bind token received in said second request is stored in said server's local store and is marked as valid; and
  if said checking step determines that said bind token is stored in said server's local store and is marked valid, scheduling said request form execution within said server, wherein said server performs further steps of;
  if said checking step returns a negative result such that said scheduling step is not reached, checking whether said token is marked as invalid; and if said token is marked invalid, returning said bind token to said client as part of a reply thereto.

7. The computer program product of claim 6 wherein the client is a pure client which can send requests to servers but cannot receive requests from other distributed computers on the network.

* * * * *